RE 24943
May 27, 1958    A. SKROBISCH    2,836,773
ELECTRICALLY CONTROLLED MAGNETIC MOVEMENT
Filed April 29, 1955
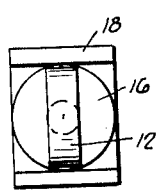
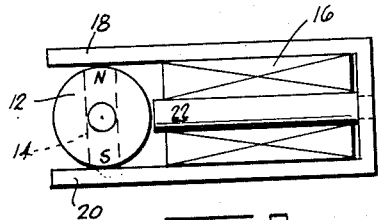
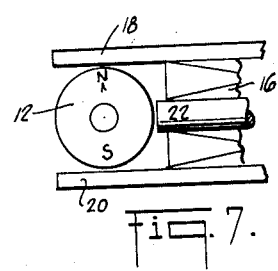
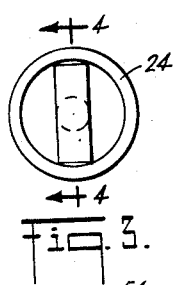
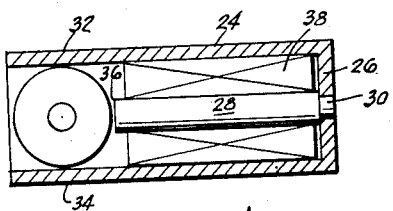
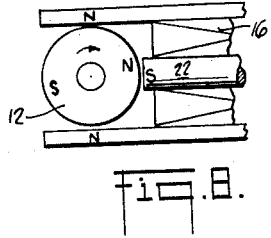
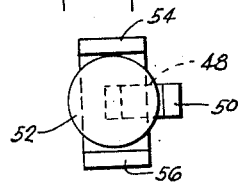
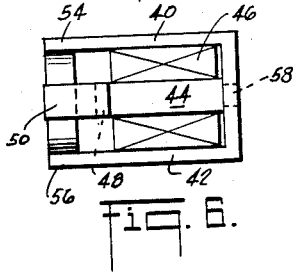
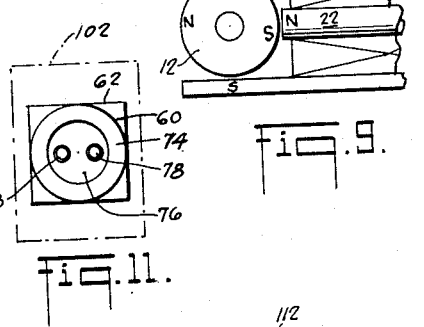
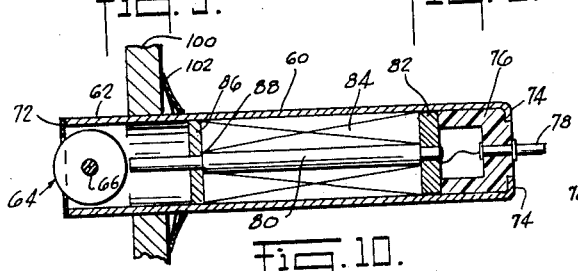
INVENTOR.
ALFRED SKROBISCH
BY James and Franklin
ATTORNEYS 2,836,773
Patented May 27, 1958

United States Patent Office

2,836,773

ELECTRICALLY CONTROLLED MAGNETIC MOVEMENT

Alfred Skrobisch, New York, N. Y., assignor to Allard Instrument Corp., New York, N. Y., a corporation of New York Application April 29, 1955, Serial No. 504,979

21 Claims. (Cl. 317—171)

This invention relates to electrically controlled magnetic movements, and more particularly to a small, rugged, simple and dependable movement which may be used for a variety of purposes.

The primary object of the present invention is to generally improve electrically controlled magnetic movements. A more particular object is to provide such a movement which may be used in lieu of a pilot light, or to indicate polarity, or as a meter movement, or as a relay movement. A further object is to provide such a movement which requires only negligible power to operate the same; which requires no restoring spring; which is more rugged than a pilot lamp; which is dynamically balanced and shockproof; and which is easily mounted on a panel.

To accomplish the foregoing general objects, and other more specific objects which will hereinafter appear, my invention resides in the electrically controlled magnetic movement and the elements thereof, and their relation one to another, as are hereinafter more particularly described in the following specification. The specification is accompanied by a drawing, in which:

Fig. 1 is a front view of an electrically controlled magnetic movement embodying features of my invention;

Fig. 2 is a side elevation thereof, with the coil in section;

Fig. 3 is a front view of a modified form of the invention;

Fig. 4 is a section taken approximately in the plane of the line 4—4 of Fig. 3;

Fig. 5 is a front view of still another form of the invention;

Fig. 6 is a side elevation thereof, with the coil in section;

Figs. 7, 8 and 9 are schematic views explanatory of the operation of the invention;

Fig. 10 is a longitudinal section through a preferred form of the invention;

Fig. 11 is a rear end view thereof;

Fig. 12 is a front end view thereof;

Fig. 13 is a section through the rotor;

Fig. 14 is explanatory of a detail;

Fig. 15 shows a spring fastener used with the indicator;

Fig. 16 shows one method of coloring the rotor when used in a non-polarized indicator; and Fig. 17 shows another method of coloring the rotor when used in a polarized indicator.

Referring to the drawing, and more particularly to Figs. 1 and 2, the movement of my invention comprises a permanent magnet 12 which is mounted for rotation. The magnet could be a bar magnet, as suggested by the broken lines 14 in Fig. 2, but for the present purpose it is convenient to use a magnet in disc form which is permanently magnetized diametrically, as shown by the letters "N" and "S." The poles of the magnet are diametrically related to the axis of rotation.

The movement further comprises a stationary electromagnet having a core made of material which may be temporarily but not permanently magnetized. For brevity the material may be referred to as being ferrous. This core when magnetized electrically by a suitable winding, here indicated by coil 16, has two spaced poles 18 and 20 of like polarity, and a single pole 22 of opposite polarity, said like poles being disposed diametrically of the axis of rotation, and the opposite pole 22 being disposed at one end of a diameter which is transverse to the diameter of the like poles. In preferred form, and as here shown, the transverse diameter is horizontal, and is perpendicular to the vertical diameter connecting the like poles 18 and 20.

The operation of this arrangement may be explained with reference to Figs. 7, 8 and 9 of the drawing. In Fig. 7 the electromagnet is de-energized, and it will be seen that the permanent magnet 12 assumes a rest position with its poles adjacent the like poles 18 and 20. This is so because the parts 18 and 20 are ferrous. When the electromagnetic is energized by passing a D. C. current through the coil 16, the single pole 22 of the ferrous frame or core attracts that pole of the rotor or permanent magnet which is of opposite polarity. Thus in Fig. 8 it is assumed that the single pole 22 is a south pole, and it attracts the north pole of the permanent magnet to it. The magnet turns about 90°. In practice the movement is slightly less than 90°.

If the coil 16 is energized with D. C. current flowing in opposite direction, so that the single pole 22 is made a north pole, the permanent magnet 12 will be rotated about 90° in opposite direction, thus bringing its south pole substantially at the single pole 22. In either case, on de-energization of the electromagnet the rotor snaps back to the rest position shown in Fig. 7, without requiring a restoring spring of any kind.

Reverting now to Figs. 1 and 2, it will be seen that the frame or core may be described as generally E-shaped, with the middle bar 22 shorter than the top and bottom bars 18 and 20. The coil 16 is disposed around the center bar 22, and between the top and bottom bars 18 and 20. The axis of rotation of the permanent magnet is transverse to the bars of the frame.

Figs. 3 and 4 show a structural modification which operates the same as the form of the invention shown in Figs. 1 and 2, but which is more convenient in some respects. Specifically, the top and bottom bars may form a part of a ferrous cylinder 24. This cylinder is closed at one end with a disc of ferrous material, as indicated at 26 in Fig. 4. The center bar 28 is a rod of ferrous material having its rear end 30 connected to the center disc 26. This rod is shorter than the cylinder, thus providing the desired E-shaped arrangement of poles previously described, there being a top pole at 32, a bottom pole at 34, and an offset or side pole at 36. The winding or coil 38 may be cylindrical in shape and dimensional to substantially fill the space between the single pole 28 and the cylindrical housing 24. It is found that this arrangement functions the same as that shown in Figs. 1 and 2.

As so far described the axis of the rotor extends perpendicularly to the bars of the frame, but this is not essential, and if desired for some special purpose, the axis of rotation may be disposed in the same direction as the center bar, and indeed may be made coaxial with it. Such an arrangement is illustrated in Figs. 5 and 6, in which there is an E-shaped frame comprising top and bottom bars 40 and 42, and a single center bar 44 surrounded by a coil 46, much as previously described. However, an L-shaped piece of ferrous metal 48 is secured to the free end of the center bar 44 to provide a single laterally offset pole 50. The rotor 52 is disposed with its vertical diameter between the like poles 54 and 56, and with one end of its horizontal diameter at the single or unlike pole 50.

The operation of this movement is substantially the same as that previously described in connection with Figs. 7, 8 and 9, that is, when the electromagnet is de-energized the permanent magnet will position itself vertically, that is, with its poles at the top and bottom poles 54 and 56. When the electromagnet is energized the single unlike pole 50 will attract one pole or the other of the permanent magnet, this turning it substantially 90° in one direction or the other, depending on the direction of flow of the D. C. current supplied to the magnet coil 46.

It will be understood that the L-shaped piece 48 may be made integral with the center bar 44 as here shown, in which case the coil 46 is slid over the center bar before the latter is secured to the outer frame at 58.

A preferred structural arrangement of my device may be described with reference to Figs. 10 through 14 of the drawing. Referring to those figures, I employ a housing 60 which is made of cylindrical ferrous material. For most of its length the cylinder is left unchanged, as indicated at 60. The forward end 62 of the housing is preferably expanded to approximately square cross-section, as is best shown in Figs. 11 and 12 of the drawing. The resulting squared end receives the rotor 64, and the axis 66 (Fig. 12) of the rotor extends across the two opposite flat walls 68 and 70 of the squared end. This end is partially closed at the front by a windowed member 72 which exposes a desired part only of the rotor.

At its rear end the cylindrical ferrous housing 60 may be turned inward to form a narrow peripheral flange 74 (Fig. 10). An insulation member 76 is slid into the housing from the forward end to the rear end, and this member preferably carries one or more electrical connection pins or soldering lugs or terminals 78. In the present case there are two such terminals, as shown in Fig. 11, but there may be a lesser or greater number of terminals.

The center bar is a ferrous rod 80, and the rear end of this rod is preferably preliminarily riveted to a ferrous disc 82. This sub-assembly is slid into the cylinder 60 as far as insulation member 76. The magnet coil 84 is slid into the cylinder around bar 80. The center bar 80 is preferably shouldered slightly or reduced in diameter, as indicated at 88. A non-ferrous disc, typically a brass disc 86, is then driven into position. This part is preferably dimensioned to provide a force fit within the cylindrical housing 60. With such an arrangement the brass disc 86 holds the stationary parts of the structure in assembled relation. Thereafter the rotor 64 and rotor pin 66 are added, and finally the front plate 72, the latter being secured in position in any desired fashion, as by the use of an epoxy resin cement.

Referring now to Fig. 13, the permanent magnet disc is indicated at 90. It has secured on each side thereof discs 92 of non-magnetic material. These are of the same diameter as the disc 90 and help form a rotor which is substantial in axial dimension, and which thus provides a large visible area when the window in the front plate 72 is appropriately widened, as shown in Fig. 12. Moreover, reverting to Fig. 13, the discs 92 are preferably made of nylon, Teflon, or an equivalent self-lubricating material, and they preferably have center holes mating with the bearing pin 66, whereas the permanent magnet 90 preferably has an oversized center hole, as shown at 94. This avoids undue friction and possible magnetic restraint at the pin 66. Inasmuch as the permanent magnet is preferably made of Alnico or equivalent alloy, which is not easy to work, it is a manufacturing convenience to employ an oversized hole 94 with no concern over bearing tolerance.

Referring now to Fig. 14, the ferrous disc 82 preferably has two small slots, indicated at 96, for the passage of wires from the coil 84. One of these wires may run to one of the connection pins 78, and the other to the other pin. It will be understood that when the housing may be grounded as one side of the circuit, a single pin will suffice.

The indicator unit shown in Figs. 10 through 14 is readily mounted on a panel in a manner shown in Fig. 10. The panel 100 has a hole mating with the cylindrical housing 60 of the indicator. The housing is inserted through the panel rear end first, or from left to right as viewed in Fig. 10. The indicator will go through the panel as far as the squared end 62. A spring or friction nut 102 having a hole therein designed for cooperation with housing 60 is then slid over the housing from the rear end toward the panel, and is pushed forward until it engages the panel tightly, as shown in Fig. 10. The precise outline of the spring nut 102 is not important to the present invention, and standard parts as made by manufacturers of so-called "Speednuts" may be used. One possible shape is shown in Fig. 15, but various other shapes may be employed. It will be understood that the incised parts are sprung or bent rearward as shown in Fig. 10 as the clip is pushed along the cylindrical housing, and thus serve to grip the housing against forward movement.

Referring now to Fig. 16, when the device is used as an indicator without reference to polarity, one part of the drum, typically a sector of 90°, may be coated with black, as indicated at 104. The adjacent sectors may be coated with white, as indicated at 106 and 108. The location of the colors with reference to the poles of the magnet is also shown. With this arrangement the indicator shows black when the electromagnet is not energized, and shows white when it is energized. Such an indicator may be used in lieu of a warning light, for with the panel dark or black in color, there is no indication in the de-energized condition, but a sizable rectangle of white appears conspicuously in the energized condition.

The black may signify normal conditions, and the white abnormal conditions to which attention is to be drawn. If the presence of current corresponds to normal conditions the coloring of the rotor may be reversed and the part 104 may be made white, while the parts 106 and 108 are made black. These coatings form a continuous surface, as shown in Fig. 13, and they conceal the fact that the rotor is made up of three discs. Other contrasting colors may be used instead of black and white.

Referring now to Fig. 17, the middle sector 110 is coated black. One adjacent sector 112 is coated red, and another adjacent sector 114 is coated green. With this arrangement the indicator will show black when the electromagnet is de-energized; it will show red when the device is energized in one polarity; and it will show green when energized in opposite polarity. Thus the green may be used to show a normal or favorable condition, and the red to show an unfavorable or dangerous condition. The black will show absence of energization, and if this is significant in itself the middle sector may, of course, be made white instead of black, to attract attention to the de-energized condition of the indicator. Here again different colors may be used instead of red and green, depending on the particular situation in which the indicator is used.

The device may be made quite small. In the particular example shown in Fig. 10 the square forward end is only ⅜" on a side, the cylindrical ferrous housing being about ⅜" in diameter. With an overall length of, say, 1¾", a coil of substantial dimension may be used, making the device dependably operable with very small power, say 0.7 watt, which is substantially less than would be required for an ordinary pilot light.

As so far described the device is used as either an indicator, or a polarity indicator. However, because the motion of the rotor is proportional to the energization of the coil when that energization is varied upward from zero, the device may also be used as a meter. The scale may be printed on the rotor, or a marker may be made on the rotor, which is then used with a stationary scale. The resulting meter is particularly simple and rugged, for there is no need for restoring springs, nor for electrical conductors leading to a moving rotor coil or the like.

The device may also be used as a part of a relay, it being necessary to add only a part moved by the rotor to control or move relay contacts. In such case, of course, two or three additional connection pins should be provided for the circuit or circuits controlled by the relay.

It is believed that the construction, assembly, and operation of my improved electrically controlled magnetic movement, as well as the advantages thereof, will be apparent from the foregoing detailed description. The device may be made quite small, and may be energized with negligible electrical power, yet is rugged and dependable in operation. It requires no restoring spring nor delicate bearings. When the magnet is in the form of a rotor, as here shown, the device is inherently dynamically balanced and is substantially shockproof. It will readily withstand an acceleration of, say, 10 G's, and may be constructed to withstand an acceleration ten times that amount. The device is easily mounted on a conventional panel, and requires very little panel room.

It will be apparent that while I have shown and described my invention in several forms, changes may be made in the structure shown, without departing from the scope of the invention, as sought to be defined in the following claims. In the claims the term "disc" is employed synonymously with "wheel," "cylinder," or "drum," and is not intended to mean that the thickness of the permanent magnet is negligible compared to its diameter. The reference in a few claims to colors such as black, white, red, and green is merely for convenience and clarity of definition, and is intended to be merely typical of the contrasting or different colors used, and is not intended to be limiting to the precise colors mentioned.

I claim:

1. An electrically controlled magnetic movement comprising a permanent magnet, means mounting the same for rotation, the poles of said magnet being diametrically related to the axis of rotation, and a stationary electromagnet having a core made of material which may be temporarily but not permanently magnetized, said core when magnetized having two spaced poles of like polarity and a single pole of opposite polarity, said like poles being disposed diametrically of the axis of rotation and said opposite pole being disposed at one end of a diameter transverse to the diameter of the like poles, whereby when the electromagnet is energized the permanent magnet rotates to bring one of its poles toward the single pole of the electromagnet, and when the electromagnet is de-energized the permanent magnet moves back to a rest position with its poles adjacent the like poles.

2. An electrically controlled magnetic movement as defined in claim 1, in which the electromagnet has an E-shaped core with the center bar shorter than the top and bottom bars, the coil of said electromagnet being disposed around the center bar and between the top and bottom bars, and in which the axis of rotation is transverse to said bars.

3. An electrically controlled magnetic movement as defined in claim 1, in which the electromagnet comprises an E-shaped core with the center bar shorter than the top and bottom bars, the coil of the electromagnet being disposed around the center bar and between the top and bottom bars, and in which an L-shaped ferrous piece is secured to the free end of the center bar to provide a single laterally offset pole, and in which the axis of rotation of the permanent magnet is in the same direction as the bars.

4. An electrically controlled magnetic movement as defined in claim 1, in which the electromagnet comprises a ferrous cylinder closed at one point by a ferrous disc and having an axial ferrous rod connected to said disc and shorter than said cylinder, the coil of the electromagnet being received within said cylinder around said rod, the axis of rotation extending diametrically across the cylinder in front of the free end of the rod, whereby the latter acts as the single pole, and diametrically opposed parts of the free end of the cylinder act as the like poles.

5. An electrically controlled magnetic movement comprising a disc of magnetic material permanently magnetized diametrically, means mounting the same for rotation, and a stationary electromagnet having a core made of material which may be temporarily but not permanently magnetized, said core when magnetized having two spaced poles of like polarity and a single pole of opposite polarity, said opposite pole being disposed at one end of a diameter which is transverse to the diameter of the like poles, whereby when the electromagnet is energized the permanent magnet rotates to bring one of its poles toward the single pole of the electromagnet, and when the electromagnet is de-energized the permanent magnet moves back to a rest position with its poles adjacent the like poles.

6. An electrically controlled magnetic movement comprising a permanent magnet, means mounting the same for rotation, the poles of said magnet being diametrically related to the axis of rotation, and a stationary electromagnet having a core made of material which may be temporarily but not permanently magnetized, said core when magnetized having two spaced poles of like polarity and a single pole of opposite polarity, said like poles being disposed diametrically of the axis of rotation and said opposite pole being disposed at one end of a diameter which is perpendicular to the diameter of the like poles, whereby when the electromagnet is energized the permanent magnet rotates to bring one of its poles adjacent the single pole of the electromagnet, and when the electromagnet is de-energized the permanent magnet moves back to a rest position with its poles adjacent the like poles.

7. An electrically controlled magnetic movement comprising a disc of a magnetic material permanently magnetized diametrically, means mounting the same for rotation, and a stationary electromagnet having a core made of material which may be temporarily but not permanently magnetized, said core when magnetized having two spaced poles of like polarity and a single pole of opposite polarity, said like poles being disposed diametrically of said disc, and said opposite pole being disposed at one end of a diameter which is perpendicular to the diameter of the like poles, whereby when the electromagnet is energized the permanent magnet rotates to bring one of its poles adjacent the single pole of the electromagnet, and when the electromagnet is de-energized the permanent magnet moves back to a rest position with its poles adjacent the like poles.

8. An electrically controlled magnetic movement as defined in claim 7, in which the electromagnet has an E-shaped core with the center bar shorter than the top and bottom bars, the coil of said electromagnet being disposed around the center bar and being the top and bottom bars, and in which the axis of rotation is transverse to said bars.

9. An electrically controlled magnetic movement as defined in claim 7, in which the electromagnet comprises an E-shaped core with the center bar shorter than the top and bottom bars, the coil of the electromagnet being disposed around the center bar and between the top and bottom bars, and in which an L-shaped ferrous piece is secured to the free end of the center bar to provide a single laterally offset pole, and in which the axis of rotation of the permanent magnet is coaxial with the center bar of the core.

10. An electrically controlled magnetic movement as defined in claim 7, in which the disc has secured on each side thereof discs of non-magnetic material of the same diameter to form a rotor which is substantial in axial dimension.

11. An electrically controlled magnetic movement as defined in claim 7, in which the disc has secured on each side thereof discs of non-magnetic material of the same diameter to form a rotor, said added discs preferably being made of a self-lubricating material, and having center holes smaller than the magnetic disc to receive the bearing pin of the resulting rotor.

12. An electrically controlled magnetic movement as defined in claim 7, in which the disc has secured on each side thereof discs of non-magnetic material of the same diameter to form a rotor which is substantial in axial dimension, said added discs preferably being made of a self-lubricating plastics material, and having center holes smaller than the magnetic disc to receive the bearing pin of the resulting rotor.

13. An electrically controlled magnetic movement as defined in claim 7, in which an arcuate part of the periphery of the disc is coated with black material, and in which an arcuate part on each side of the black material is coated with white material, the arrangement being such that the indicator shows black when the coil is de-energized, and shows white when the coil is energized with D. C. current of either polarity.

14. An electrically controlled magnetic movement as defined in claim 7, in which an arcuate part of the periphery of the disc is coated with black material, and in which an arcuate part on one side of the black material is coated with red material, and in which an arcuate part on the other side of the black material is coated with green material, the arrangement being such that the indicator shows black when the coil is de-energized, and shows red when the coil is energized with D. C. current of one polarity, and shows green when the coil is energized with D. C. current of opposite polarity.

15. An electrically controlled magnetic movement as defined in claim 7, in which the electromagnet comprises a ferrous cylinder closed at one point by a ferrous disc and having an axial ferrous rod connected to said disc and shorter than said cylinder, the coil of the electromagnet being received within said cylinder around said rod, the axis of rotation extending diametrically across the cylinder in front of the free end of the rod, whereby the latter acts as the single pole, and diametrically opposed parts of the free end of the cylinder act as the like poles.

16. An electrically controlled magnetic movement as defined in claim 15, in which the ferrous cylinder is expanded to approximately square cross-section at the end receiving the disc, and in which the axis of the disc extends across two opposite flat walls of the squared end, said end being partially closed by a windowed member to expose a desired part only of the disc.

17. An electrically controlled magnetic movement as defined in claim 15, in which the rear end of the ferrous cylinder is turned inward to form a peripheral flange, an insulation member carrying one or more electrical connection pins received in said cylinder with the pins projecting from the flanged end, the center bar of the core being secured to the ferrous disc and slid into the cylinder, the center bar being shouldered at the forward end of the coil, and a non-ferrous disc being forced into the cylinder with a force fit as far as the shoulder, thereby holding the parts in assembled relation.

18. An electrically controlled magnetic movement as defined in claim 15, in which the ferrous cylinder is expanded to approximately square cross-section at the forward end receiving the disc, and in which the axis of the disc extends across two opposite flat walls of the squared end, the opposite end of the cylinder being turned inward to form a peripheral flange, an insulation member carrying one or more electrical connection pins received in said cylinder with the pins projecting from the flanged end, the center bar of the core being secured to the ferrous disc and slid into the cylinder, the center bar being shouldered at the forward end of the coil, and a non-ferrous disc being forced into the cylinder with a force fit as far as the shoulder, thereby holding the parts in assembled relation.

19. An electrically controlled magnetic movement as defined in claim 15, in which the ferrous cylinder is expanded at the forward end receiving the disc, and a spring friction nut is slid over the outside of the cylinder from the rear end toward the forward end in order to hold the cylinder in a panel.

20. An electrically controlled magnetic movement as defined in claim 15, in which an arcuate part of the periphery of the disc is coated with black material, and in which an arcuate part of the periphery on each side of the black material is coated with white material, the arrangement being such that the indicator shows black when the coil is de-energized and shows white when the coil is energized with D. C. current of either polarity.

21. An electrically controlled magnetic movement as defined in claim 15, in which an arcuate part of the periphery of the disc is coated with black material, and in which an arcuate part on one side of the black material is coated with red material, and in which an arcuate part on the other side of the black material is coated with green material, the arrangement being such that the indicator shows black when the coil is de-energized, and shows red when the coil is energized with D. C. current of one polarity, and shows green when the coil is energized with D. C. current of opposite polarity.

References Cited in the file of this patent
UNITED STATES PATENTS

| | | |
|---|---|---|
| 1,743,478 | Pratt | Jan. 14, 1930 |
| 2,415,452 | Taylor | Feb. 11, 1947 |
| 2,747,045 | Parmer | May 22, 1956 |
| 2,771,572 | Adams | Nov. 20, 1956 |